Patented Aug. 14, 1945

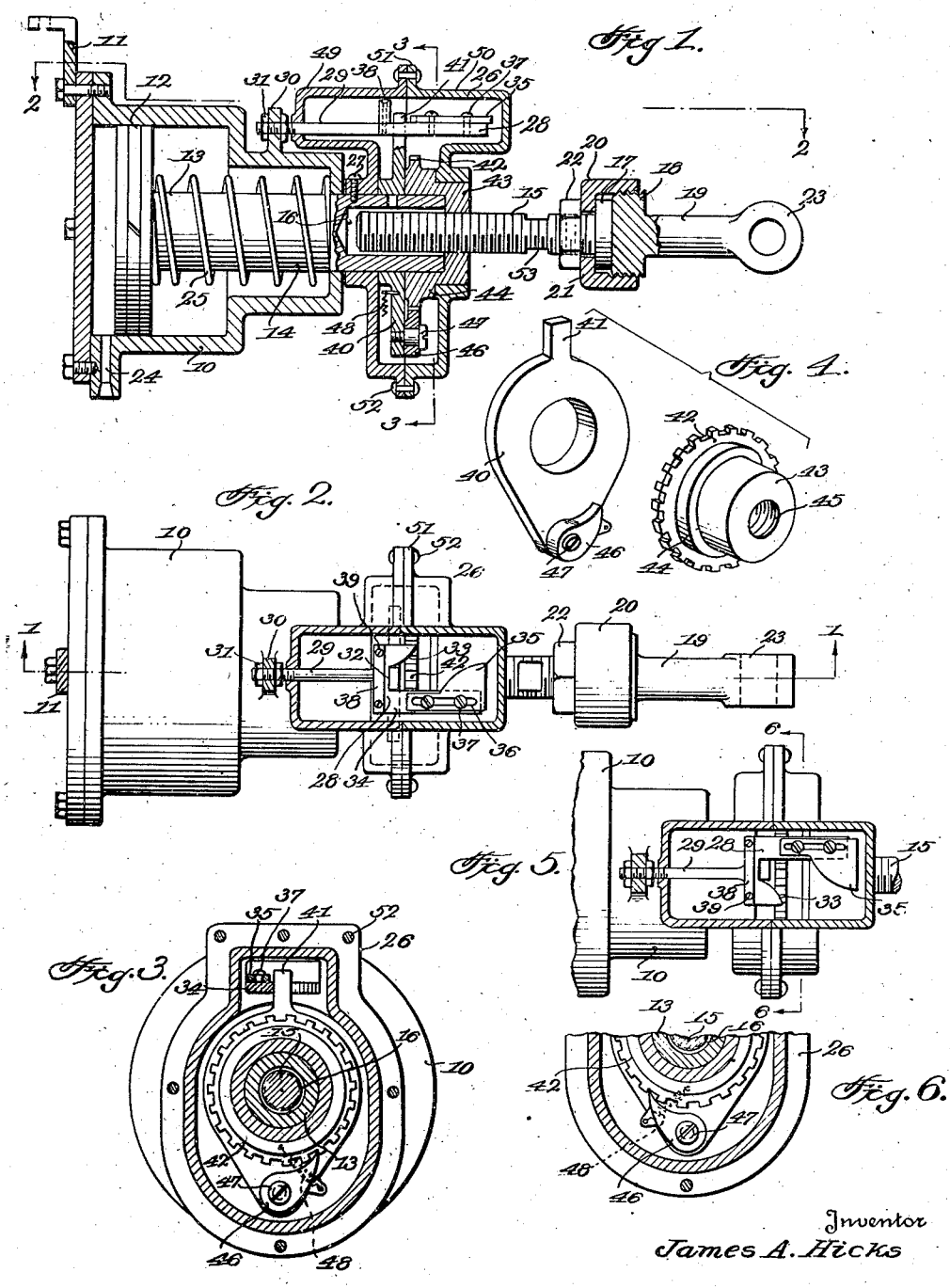

2,382,223

UNITED STATES PATENT OFFICE 2,382,223

BRAKE EQUALIZER

James A. Hicks, Atlanta, Ga.; Robert L. Holbrook, administrator of said James A. Hicks, deceased, assignor to A. L. Belle Isle Application December 6, 1943, Serial No. 513,205

9 Claims. (Cl. 188—202)

The present invention relates to an improved equalizing device for automatically taking up slack and compensating for wear in a braking system and for controlling the movement or take-up of a brake pedal, and is applicable to any of the well-known types of brake devices associated with motor vehicles, trains, and the like.

An important object of the invention is to provide simple, efficient, positive, and economical means whereby the slack developed in a braking system due to the wear of the brake shoes, stretching of the brake rigging, increase in the throw or movement of the foot pedal, wear or distortion of the connecting levers, or other well-known causes, is automatically taken up.

A further object consists in associating with the piston rod of a brake cylinder, an adjustable member and means operable by the piston, when the working stroke of the latter exceeds a predetermined distance, to move the adjustable member axially relative to the piston rod either to expand the adjustable member or to contract the same in order to take up the slack developed in the braking system.

A further object comprehends the provision of a brake equalizer in which an actuator revolubly mounted on the piston rod and axially movable therewith, is operatively associated with a pair of spaced fixed cams and is also operatively connected to an adjustable rod or push bar through a pawl and ratchet mechanism in order to be moved as a unit with the piston rod when the brake is applied and released, and is arranged when slack develops in the braking system to be actuated by one of the cams during the working stroke of the piston in one direction, and moved in an opposite direction upon the return stroke or release of the piston to effect the rotation of the ratchet mechanism which imparts axial movement to the adjustable member to expand the same and take up the slack without affecting the normal working stroke of the piston.

A further object consists in associating with the equalizer, reversible or interchangeable means for either expanding the adjustable member relative to the piston rod or for contracting the same to compensate for wear or slack developed in the brake mechanism.

A further object is to provide a brake equalizer which is operable free of the load and is not subjected to brake pressure or to strain on the parts, and takes up the slack upon the return stroke of the piston free of resistance except the weight of the parts.

Other objects and advantages of the invention will become apparent from the following description when taken in conjunction with the accompanying claims and drawing.

Referring to the drawing, in which is shown a preferred embodiment of the invention:

Figure 1 is a sectional view taken substantially along the line 1—1 of Figure 2, and also shows means to effect the expansion of the adjustable member.

Figure 2 is a sectional view taken substantially along the line 2—2 of Figure 1.

Figure 3 is a sectional view taken substantially along the line 3—3 of Figure 1.

Figure 4 is an exploded view of the actuator and the ratchet mechanism.

Figure 5 is a view substantially similar to Figure 2 but showing the parts reversed so as to contract or shorten the adjustable member, and Figure 6 is a sectional view taken substantially along the line 6—6 of Figure 5.

My improved brake equalizer or adjuster is constructed and arranged to be capable of association with an air brake system, a hydraulic brake, or a mechanical brake, and may be either directly or indirectly connected to the brake apparatus. As shown, the equalizer is associated with a horizontally disposed air brake cylinder 10 which may be connected to the body or chassis of the vehicle through the brackets 11 and which may, if desired, be positioned to work vertically.

A reciprocating piston 12 in the cylinder 10 has a piston rod 13 which preferably extends beyond the outer end of the cylinder and may be composed of the sections 14 and 15 to provide an adjustable member or push bar movable axially relative to the piston rod 13. The section 14 has at its outer end an elongated slot or recess 16 which loosely or freely receives the adjacent section 15. The outer end of the section 15 may be provided with a head 17 which bears against an enlarged threaded portion 18 of the arm 19 and is detachably connected to the arm by a sleeve or collar 20 having a flange portion 21 confined between the head 17 and a jam nut 22 on the section 15. The free end 23 of the arm 19 is arranged to be connected to the brake drum of the wheel or any other part of the braking system as may be desired. Thus it will be seen that the section 15 may be readily adjusted relative to the section 14 and the bar 19 upon the loosening of the collar 20 without necessitating the complete removal of the section 15.

The brake pedal of the vehicle is connected to a valve not shown, which controls the admission of air into the cylinder 10 through the port 24 for effecting the outward movement of the piston 12 to apply the brake. A coil spring 25 on the piston rod 13 confined between the piston 12 and the outer end of the cylinder 10, acts normally to maintain the piston in its inoperative position and to return the same upon the exhaustion of the air from the cylinder when the brake is released.

A housing 26 is fastened to the piston rod 13 in any suitable manner such as by the screw 27 so as to be axially movable therewith. Mounted in the housing 26 is a fixed plate or member 28 having an arm 29 which extends through the housing 26 and which may be connected to the cylinder 10 by the jam nuts 31. The plate 28 has a medial and straight cut-out portion 32 flanked on one side by a cam 33 and on the other side by a longitudinally extending arm or side 34. A cam 35 extends inwardly from the plate 28 in a direction opposite to the cam 33 and may have an elongated slot 36 which receives the screws 37 for adjustably connecting the cam 35 to the plate 28. Manifestly the cam 35 may be formed integral with the plate 28 instead of being adjustably connected thereto. The plate 28 is preferably provided with a transversely disposed rib or projection 38 which is detachably secured thereto by the screws 39 and is arranged to bear against the inner wall of the housing 26 to insure the plate 28 and its associated parts being firmly maintained in a fixed position in the housing.

Revolubly mounted on the piston rod 13 and within the housing 26, is an actuator 40 which may be of any suitable configuration and which, as shown, has an upwardly projecting lug or arm 41 which extends into the cut-out portion 32 of the plate 28. Also mounted on the piston rod 13 is a ratchet wheel or member 42 which has its hub 43 extending through the housing 26 and which may also be provided with an annular shoulder 44 (Fig. 4) which abuts against the adjacent wall of the housing so that when the parts are assembled, the actuator 40 and the member 42 assume the position shown in Figure 1. The hub 43 of the member 42 is provided with a threaded bore or opening 45 to which is connected the threaded section 15 of the piston rod. A pawl or dog 46 is releasably connected to the actuator 40 by the bolt or pin 47 and is arranged to be maintained in engagement with a tooth of the ratchet wheel 42 by a spring 48 connected at one end to the dog and at its opposite end secured to the actuator.

When the equalizer is associated with an air brake cylinder the parts are normally in the position as shown in Figure 1. Upon the brake being applied, air is forced into the cylinder 10 to move the piston rod 12 and its associated parts outwardly to apply the brake. If no slack or wear has developed in the brake shoes or the brake equipment, the housing 26 and the actuator 40 move as a unit axially with the piston rod from the position shown in Figure 2 to the lower edge of the cam 35 without affecting the rotation of the actuator 40. This distance, which has previously been determined, comprises the allowable range of movement of the housing 26 during the normal application of the brake. In the event the brake shoes or the brake rigging begin to wear, it will be seen that upon the application of the brake, the piston rod 13 will be moved outwardly a distance beyond the normal throw of the working stroke of the piston. When this occurs the lug 41 on the actuator 40 is brought into engagement with the cam surface 35 to rotate the actuator 40 in a clockwise direction. The dog 46, which in the meantime is in engagement with one of the teeth of the ratchet wheel 42 (Fig. 3), is carried by the actuator 40 to the left of the position shown in Figure 3 so as to engage another tooth of the ratchet. Upon the brake being released and the piston rod 13 returned to its normal position by the spring 25, the lug 41 is moved with the piston rod and is brought into engagement with the cam 33 to be rotated in a counter-clockwise direction or opposite to the direction of movement imparted to it by the cam 35. As the dog 46 is in engagement with a tooth of the ratchet wheel 42 during this return movement it will impart a rotative movement to the ratchet in a counterclockwise direction. This movement of the ratchet 42 by reason of the threaded engagement of the same with the section 15 of the piston rod imparts a concomitant axial movement to the section 15 to expand or extend the same relative to the section 14, thus automatically operating to take up slack developed in the brake shoe or the brake equipment, without affecting or varying the normal working stroke of the piston 12. The housing 26 is preferably composed of the sectional portions 49 and 50 which may have outwardly extending opposed flanges 51 detachably connected by the bolts 52 to permit the removal of one of the sections so as to obtain access to the interior of the housing.

When the equalizer is associated with an air brake, the cams 33 and 35 are spaced the proper distance apart so that during the normal working stroke of the piston 12 the lug 41 on the actuator 40 will not be moved into engagement with the cam 35. The section 15 of the piston rod which also constitutes an adjustable push-bar or member is connected to the arm 19 in such a fashion that when the equalizer is initially installed, or at any time thereafter, the section 15 may be readily adjusted relative to the section 13 and the arm 19, upon the loosening of the collar 20 and the applying of a suitable tool or wrench to the flat or reduced portion 53 of the rod 15, so that the section 15 may be adjusted axially relative to the section 14. When the collar 20 is clamped or tightened on the arm 19, the section 15 is firmly connected to the latter and is maintained in a rigid position relative thereto. During the application of the brake in normal operation, the working stroke of the piston moves the housing 26 and its associated parts outwardly with the piston rod 13 to apply the brake but does not disturb the actuator 40. As an equalizer is connected to each wheel of the vehicle, and as the working stroke of each piston is the same, a smooth and uniform application of the brakes is insured.

The operating parts of the equalizer are so associated with the piston rod 13 as to be free from any strain or resistance developed by the movement of the piston during its working stroke. Further, when slack occurs the lug 41, upon being brought into engagement with the cam 35, oscillates the actuator 40 without transmitting any pressure or strain to the cams or the plate 28. On the return stroke of the piston the lug 41 is moved by its engagement with the cam 33 and during this movement, is unopposed by the cylinder pressure since the same has been previously released. Consequently the parts of the equalizer are not subjected to any serious strain or resistance which might impair its efficiency since the only load the actuator 40 and the cam mechanism 42 have to bear is their own weight. Thus the life and durability of the equalizer are indefinitely prolonged. In other words, the equalizer does not operate during the working stroke of the piston since if it did it would have to oppose or work against the air pressure that actuates the piston rod, which would render it incapable of efficiently carrying out its function. If, for any reason, the parts have to be replaced, access may be had to the interior of the housing 26 upon the removal of the section 50.

It is essential that the working strokes of the pistons associated with the equalizers with which the brake shoes are connected, be substantially uniform and constant. In other words, any variations in the throw of the pistons has a serious effect on their braking power, even though it be very slight. Consequently, if the pistons associated with the wheels do not register the same stroke, it is impossible to obtain equal or uniform application of braking power at the brakes. On the other hand, if all of the pistons register the same stroke, it will insure the brakes being smoothly and uniformly applied.

By reason of the present invention, the automatic expansion of the piston rod or adjusting bar to compensate for wear or slack developed in the braking system, insures the stroke of each of the pistons being substantially the same.

The necessity of having the pistons register the same degree of stroke is very important to the efficiency of any air brake mechanism, since it has been found that the number of cubic inches the capacity of a brake cylinder will change for each increase or decrease of piston travel, is numerically equal to the area of the cylinder. Thus the capacity of an 8 inch cylinder will change 50¼ cubic inches for every 1 inch change in the piston travel; that of a 10 inch cylinder will change 78½ cubic inches, and that of a 12 inch cylinder, 113 cubic inches.

It may be mentioned that any brake equalizing system wherein the operating parts are arranged to contract or expand against the working pressure of the piston have been found to be inoperative or inefficient due to the fact that on the application of the brake, the air pressure introduced into the brake cylinder is such that the actuating and retaining means of the equalizer are incapable of withstanding or resisting this pressure and therefore cannot operate against it. In other words, a ratchet mechanism interposed in an air brake system for moving one of the members relative to the other during the working stroke to take up slack through the engagement of a dog with the ratchet member would be inoperative, since the dog would be incapable of withstanding this pressure or of moving the ratchet wheel against it. If the present invention, the parts are so arranged and associated as to take up the slack on the return stroke of the piston rod, and consequently the equalizer is not subjected ot excessive wear or strain.

The cam 35 is adjustably connected to the plate 28 so that the equalizer may be readily connected to pistons having different working strokes. The projection 38 on the plate 28 acts to support rigidly the cams 33 and 35 and prevents these cams and the plate 28 from being moved or dislodged from their fixed positions when the actuator and the ratchet wheel are rotated to take up slack in the brake equipment.

As shown in Figure 1, the equalizer is directly connected through the adjusting rod 15 and the arm 19 to the brake drum of the wheel so that the slack is taken up by reason of the expansion or lengthening of the rod 15. The equalizer may also be efficiency used through an indirect connection with the braking system to compensate for wear by contracting or shortening the section 15 relative to the section 14. In other words, the equalizer is interchangeable or reversible and may be used either to expand or contract the section rod 15 without any substantial reorganization of its parts and at a minimum expenditure of time and labor.

In the event it is desired to use the equalizer to take up slack or compensate for wear, by having the adjustable member or section 15 contract rather than expand, this may be very conveniently done by the simple expedient of reversing the position of the cams 33 and 35 and the pawl 46 so that these parts may assume the position shown in Figures 5 and 6. To make this change, the section 50 of the housing 26 is removed to permit access to the actuator 40, and the nuts 31 are loosened so that the plate 28 may be turned or reversed. The projection 38 in the meantime has been disconnected from the plate 28 and after the latter is turned, is again secured thereto by the screws 39 so as to assume the position shown in Figure 5 and prevent the plate from rocking or moving during the actuation of the parts. The pawl 46 is withdrawn from the pin 47 and turned so as to take the position shown in Figure 6. This rearrangement of the cams and the pawl will, upon the working stroke of the piston exceeding a predetermined distance, cause the rotation of the actuator 40 which, through its connection with the section 15 of the piston rod, will move the latter axially and inwardly relative to the section 14. Otherwise, the construction and operation of the equalizer is substantially similar to that previously described.

While for the purpose of illustration the brake equalizer has been shown associated with an air brake, it may with equal efficiency be applied to hydraulic brakes or mechanical operating brakes to take up slack or control the movement of various parts. Heretofore in hydraulic control brakes it has been necessary, when the brake pedal moves closer than one inch from the floor board, to require the brakes to be manually readjusted. In order automatically to control the movement of the brake pedal in such a hydraulic brake, my equalizer, without any substantial reorganization of its parts, may be connected through the arm 19 to the brake pedal and the brake drum. If this is done, the air valve communicating with the cylinder through the port 24 is cut off and the cams 33 and 35 are properly adjusted relative to each other to take care of the normal throw of the foot pedal and to move the actuator 40 when the throw of the pedal exceeds a predetermined distance so as automatically to take up the slack which caused this increased movement to be imparted to the foot pedal. The spring 25 will act to return the parts to their normal position and the housing 26 will move as a unit with the cylinder 10.

As the operating parts of the equalizer are completely enclosed within the housing 26, once the adjustable member 15 and the cams 33 and 35 have been properly set, there is little or no danger of these parts being tampered with by an unauthorized party.

Further, the equalizer may be also associated with mechanical operating instrumentalities for taking up the slack in brake systems, such as supplementary levers or the like, so as to impart axial movement to the piston rod or adjusting bar to either expand or contract the same as may be desired.

Thus it will be seen that a brake equalizer is provided which by reason of its interchangeability of parts may be operated either to expand or contract an adjustable member which connects the piston to the brake drum or any other suitable part of the braking system. Additionally, the equalizer is operated to take up slack or compensate for wear on the return stroke or release of the piston rod so that the equalizer is not subjected to any excessive pressure or resistance.

When the equalizer is assembled, the housing 26 may be filled with a suitable lubricant such as dry graphite or the like which will not be detrimentally influenced by climatic changes.

As devices of this character are required to operate in more or less of a restricted area, it will be noted that the compactness of the parts renders the equalizer admirably suited for taking up slack on different designs of cars and equipment, and can be readily installed. Further, the equalizer is so constructed that it is capable of withstanding the hard usage and vibrations to which a device of this character is subjected.

It is to be understood that the forms of the invention shown and described are merely illustrative of preferred embodiments, and that such changes may be made as fall within the purview of one skilled in the art without departing from the spirit of the invention and the scope of the appended claims.

I claim:

1. An equalizing device of the class described including a cylinder, a reciprocating member in said cylinder, yieldable means to maintain the reciprocating member normally in its inoperative position, an adjustable element connected to the reciprocating member and movable axially relative thereto, a fixed plate having a pair of spaced oppositely disposed cams, means for adjusting one of the cams longitudinally relative to the other cam, an actuator revolubly mounted on the reciprocating member and operatively associated with the spaced cams, and means operatively connecting the actuator to the adjustable element whereby upon the reciprocating member being moved beyond a predetermined distance automatically to rotate said actuator and impart a concomitant axial movement to the adjustable element relative to the reciprocating member.

2. An equalizing device of the class described including a cylinder, a reciprocating piston in said cylinder, said piston having a sectional piston rod, yieldable means for maintaining the piston in its normal position, means for moving the piston outwardly against the pressure of the yieldable means, one of said sections having a recess in one end for receiving the adjacent threaded end portion of the other section, a housing connected to the piston rod so as to be movable therewith, spaced fixed cams in said housing, an actuator revolubly mounted on the piston rod and having a projection extending into the space between the cams so as to be moved in one direction by one of the cams when the piston is moved outwardly beyond a predetermined distance and to be moved in an opposite direction by the other cam upon the return stroke of the piston, and means operatively connecting the actuator to the threaded section of the piston rod whereby the movement of the actuator imparts a concomitant axial movement to the threaded section relative to the other section of the piston rod.

3. An equalizing device of the class described including a cylinder, a reciprocating piston in said cylinder, said piston having a sectional piston rod, yieldable means for maintaining the piston in its normal position, means for moving the piston outwardly against the pressure of the yieldable means, one of said sections having a recess in one end for receiving the adjacent threaded end portion of the other section, a housing connected to the piston rod so as to be movable therewith, spaced fixed cams in said housing, means to adjust the cams to vary the space therebetween, an actuator revolubly mounted on the piston rod and having a projection extending into the space between the cams so as to be moved in one direction by one of the cams when the piston is moved outwardly beyond a predetermined distance and to be moved in an opposite direction by the other cam upon the return stroke of the piston, and means operatively connecting the actuator to the threaded section of the piston rod whereby the movement of the actuator imparts a concomitant axial movement to the threaded section relative to the other section of the piston rod.

4. An equalizing device of the class described including a cylinder, a reciprocating piston in said cylinder, said piston having a sectional piston rod, one of said sections having a recess in one end to receive the adjacent threaded end portion of the other section, a housing connected to the piston rod so as to be movable therewith, a fixed plate within the housing provided with spaced cams, said plate having a portion extending from the housing and connected to the cylinder, an actuator revolubly mounted on the piston rod and having a projection extending into the space between the cams so as to be moved in one direction by one of the cams when the piston is moved axially beyond a predetermined distance and to be moved in an opposite direction by the other cam upon the return stroke of the piston, and means operatively connecting the actuator to the threaded section of the piston whereby upon the piston being moved beyond its predetermined distance to cause the axial movement of the threaded section relative to the other section.

5. An equalizing device of the class described including a cylinder, a reciprocating piston in said cylinder, said piston having a sectional piston rod, one of said sections having a recess in one end to receive the adjacent threaded end portion of the other section, a housing connected to the piston rod so as to be movable therewith, a fixed plate within the housing provided with spaced cams, means to prevent movement of the plate relative to the cylinder, said plate having a portion extending from the housing and connected to the cylinder, an actuator revolubly mounted on the piston rod and having a projection extending into the space between the cams so as to be moved in one direction by one of the cams when the piston is moved axially beyond a predetermined distance and to be moved in an opposite direction by the other cam upon the return stroke of the piston, and means operatively connecting the actuator to the threaded section of the piston whereby upon the piston being moved beyond its predetermined distance to cause the axial movement of the threaded section relative to the other section.

6. An equalizing device of the class described including a cylinder, a reciprocating piston in said cylinder, said piston having a sectional piston rod, one of said sections having a recess in one end to receive the adjacent threaded end portion of the other section, a housing connected to the piston rod so as to be movable therewith, a fixed plate within the housing provided with spaced cams, means on the plate and engaging the housing to insure the cams being maintained in a fixed position, said plate having a portion extending from the housing and connected to the cylinder, an actuator revolubly mounted on the piston rod and having a projection extending into the space between the cams so as to be moved in one direction by one of the cams when the piston is moved axially beyond a predetermined distance and to be moved in an opposite direction by the other cam upon the return stroke of the piston, and means operatively connecting the actuator to the threaded section of the piston whereby upon the piston being moved beyond its predetermined distance to cause the axial movement of the threaded section relative to the other section.

7. In a brake equalizing device of the class described, a brake cylinder, a reciprocating piston in said cylinder, said piston having a sectional piston rod, one of said sections having a non-threaded recess in one end for receiving the adjacent threaded end portion of the other section, a housing connected to the piston rod so as to be axially movable therewith, a fixed plate within the housing provided with spaced cams extending inwardly from opposite sides of the plate, an actuator revolubly mounted on the piston rod and having a projection extending into the space between the cams so as to be rocked in one direction by one of the cams when the piston rod is moved axially beyond a predetermined distance and to be moved in an opposite direction by the other cam upon the return of the piston, and means operatively connecting the actuator to the threaded section whereby upon the movement of the piston rod beyond a predetermined distance to impart an axial movement to the threaded section relative to the other section to take up slack in the brake system.

8. An equalizing device of the class described including a reciprocating rod, an adjustable bar connected at one end to said rod, an operating arm in alignment with the other end of the adjustable bar, and a clamping member threaded to said arm and having a flanged portion engaging the adjustable bar whereby to rigidly secure the bar to the arm and to permit the adjustment of the bar relative to the rod upon the loosening of the clamping member on the arm.

9. An equalizing device of the class described including a cylinder, a reciprocating member in said cylinder, yieldable means for maintaining the reciprocating member normally in its inoperative position, an adjustable element connected to the reciprocating member, and movable axially relative thereto, spaced fixed cams associated with the adjustable element, an actuator revolubly mounted on the reciprocating member and operatively associated with the spaced cams, said cams and actuator being reversibly mounted in their operative positions, and means operatively connecting the actuator to the adjustable element, the parts being constructed and arranged so that when the cams and revoluble member are mounted in one position and the reciprocating member is moved beyond a predetermined distance, it automatically effects a concomitant axial movement to the adjusting element relative to the reciprocating member to lengthen the adjustable element and when the actuator cams are mounted in a reverse position, the movement of the reciprocating member, shortens the adjustable element relative to the reciprocating member.

JAMES A. HICKS.